United States Patent
Moshenberg et al.

(10) Patent No.: US 9,735,981 B2
(45) Date of Patent: Aug. 15, 2017

(54) FACILITATION OF SESSION INITIATION PROTOCOL TRUNKING

(71) Applicant: AT&T Intellectual Property I, L.P., Atlanta, GA (US)

(72) Inventors: Dave Moshenberg, Fort Lee, NJ (US); Gautham Natarajan, Morganville, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 156 days.

(21) Appl. No.: 14/636,696

(22) Filed: Mar. 3, 2015

(65) Prior Publication Data

US 2016/0261488 A1    Sep. 8, 2016

(51) Int. Cl.
| | |
|---|---|
| *H04L 1/00* | (2006.01) |
| *H04L 12/46* | (2006.01) |
| *H04L 29/06* | (2006.01) |
| *H04L 29/12* | (2006.01) |

(52) U.S. Cl.
CPC ...... *H04L 12/4633* (2013.01); *H04L 63/0272* (2013.01); *H04L 63/0428* (2013.01); *H04L 65/1006* (2013.01); *H04L 61/2007* (2013.01); *H04L 63/164* (2013.01)

(58) Field of Classification Search
CPC . H04L 12/4604; H04L 12/5689; H04L 45/00; H04L 45/10; H04L 45/22; H04L 49/25; H04L 49/256; H04L 12/64; H04W 84/04; H04W 88/06; H04W 40/00; H04W 40/02; H04J 14/0267; H04J 2203/0023; H04J 2203/0053; H04M 2215/42

USPC ........... 370/338, 351, 352, 355, 356, 39; 455/562.1, 464, 444, 424

See application file for complete search history.

(56) References Cited

U.S. PATENT DOCUMENTS

| | | | |
|---|---|---|---|
| 6,977,933 | B2 | 12/2005 | Soncodi et al. |
| 7,289,522 | B2 | 10/2007 | Gallant |
| 7,372,826 | B2 | 5/2008 | Dahod et al. |
| 8,130,677 | B2 | 3/2012 | Barker et al. |

(Continued)

FOREIGN PATENT DOCUMENTS

| | | |
|---|---|---|
| CA | 2745177 A1 | 1/2012 |
| CN | 102448021 A | 5/2012 |

(Continued)

OTHER PUBLICATIONS

Huitema, et al, "Architecture for Internet Telephony Service for Residential Customers," Bellcore, Mar. 2, 1999, 14 pages.

(Continued)

*Primary Examiner* — Dady Chery
(74) *Attorney, Agent, or Firm* — Amin, Turocy & Watson, LLP

(57) ABSTRACT

Session initiation protocol (SIP) trunking can be facilitated via a mobility network comprising a router and a virtual internet gateway. A router associated with a private branch exchange, can comprise a cellular modem to facilitate radio communication with a cellular network. The router can also perform operations associated with converting wireline signal data to cellular signal data and cellular signal data to wireline signal. A mobility network can also convert wireline signal data to cellular signal data via a virtual Internet gateway that can be used to encrypt or decrypt a voice signal.

20 Claims, 12 Drawing Sheets

(56) References Cited

U.S. PATENT DOCUMENTS

| | | |
|---|---|---|
| 8,228,897 B2 | 7/2012 | Mitchell |
| 8,774,170 B2 | 7/2014 | Kyle |
| 8,774,171 B2 | 7/2014 | Mitchell |
| 8,781,515 B2 | 7/2014 | Agulnik et al. |
| 8,855,285 B1 | 10/2014 | Bracken et al. |
| 2010/0002661 A1* | 1/2010 | Schmidt .............. H04W 88/085 370/338 |
| 2010/0023609 A1 | 1/2010 | Vangala et al. |
| 2011/0149954 A1 | 6/2011 | Poremba et al. |
| 2012/0270546 A1 | 10/2012 | Yoon et al. |
| 2013/0029714 A1 | 1/2013 | Koren et al. |
| 2013/0137418 A1 | 5/2013 | He |
| 2013/0163433 A1 | 6/2013 | Baldwin et al. |
| 2014/0012996 A1 | 1/2014 | Brunel et al. |
| 2014/0098945 A1 | 4/2014 | Terpstra et al. |
| 2014/0341215 A1 | 11/2014 | Qiu et al. |
| 2014/0364118 A1 | 12/2014 | Belghoul et al. |

FOREIGN PATENT DOCUMENTS

| | | |
|---|---|---|
| CN | 103944918 A | 7/2014 |
| GB | 2458553 A | 9/2009 |
| JP | 2008236201 A | 10/2008 |
| WO | 2008011821 A1 | 1/2008 |
| WO | 2013170650 A1 | 11/2013 |

OTHER PUBLICATIONS

Sparks, "SIP: Basics and Beyond." Mar. 2007, pp. 22-33, ACM Queue.

Lee, et al, "Architecture to Be Deployed on Strategies of Next Generation Networks," 2003, pp. 819-822, IEEE.

Wedlund, "Mobility support using SIP," Proceedings of the 2nd ACM International Workshop on Wireless Mobile Multimedia, 1999, pp. 76-82, ACM, Seattle, Washington.

Aweya, "Trunking of TDM and Narrowband Services over IP Networks," International Journal of Network Management, 2003, vol. 13, Issue 1, 2 pages, John Wiley & Sons, Ltd., Last Accessed Dec. 19, 2014.

Schulzrinne, et al., "The Session Initiation Protocol: Internet-Centric Signaling", IEEE Communications Magazine, Oct. 2000, pp. 134-141, IEEE.

* cited by examiner

FACILITATION OF SESSION INITIATION PROTOCOL TRUNKING

TECHNICAL FIELD

This disclosure relates generally to session initiation protocol (SIP) trunking to perform wireline to cellular and cellular to wireline signal conversions. More specifically, this disclosure relates to facilitation of SIP trunking via a router with a cellular modem, a mobility network, and a virtual Internet gateway.

BACKGROUND

SIP trunking is a voice over internet protocol (VoIP) and streaming media service by which Internet telephony service providers (ITSPs) deliver telephone services and unified communications to customers equipped with SIP-based private branch exchange (IP-PBX) and unified communications facilities. Unified communications software applications provide voice, video, and other streaming media applications such as desktop sharing, web conferencing, and shared whiteboard.

The architecture of SIP trunking provides a partitioning of the unified communications network into two different domains of expertise: 1) private domain, which is a VoIP solution realized at a customer's home that takes advantage of phone and unified communication services; and 2) public domain, which is a full VoIP access solution to the public switched telephone network (PSTN)/public land mobile network (PLMN) property and responsibility of the ITSP that provides phone service. The interconnection between the two domains must occur through a SIP trunk. The interconnection between the two domains, created by transport via an Internet protocol (IP), involves setting specific rules and regulations as well as the ability to handle some services and protocols that fall into the well-defined name of SIP trunking.

Although the ITSP is responsible to the applicable regulatory authority regarding law obligations of the public domain, the private domain is not subject to particular constraints of law, and may be either the responsibility of the ITSP, the end user (enterprise), or of a third party who provides the voice services to a company. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
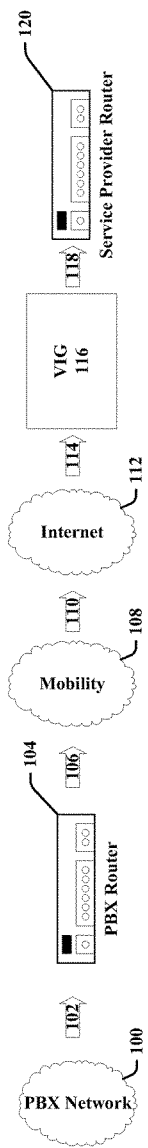
FIG. 1 illustrates an example system for a PBX router converting wireline signal data to cellular signal data.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview of various embodiments presented herein, to correct for the above-identified deficiencies and other drawbacks of SIP trunking, various embodiments are described herein to facilitate the use of a cellular-based SIP trunking.

For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a computer readable storage medium) to facilitate transporting and transferring such methodologies to computers. The term article of manufacture, as used herein, is intended to encompass a computer program accessible from any computer-readable device, carrier, or media, including a non-transitory computer readable storage medium.

A mobility cloud can have several functionalities. A private broadcast exchange (PBX) wireless-modem can send unique credentials (user-ID and service-selector) of the PBX to the mobility cloud, which can facilitate several functionalities. It can increase overall security by checking the User-ID credentials to establish the right of a particular user to use the associated service-selector. If the check is successful, meaning that a particular PBX is allowed to use the associated service-selector, then an IP address from a specific range of IP addresses, which is identified by the service-selector, can be allocated to the PBX router. The Mobility cloud allocated IP address, being part of a specific IP address range, can increase overall security by allowing a firewall situated at the virtual internet gateway (VIG) to allow a particular voice signal through. If the voice signal has an IP address not belonging to an IP address range that is associated with the PBX, then that particular stream can be blocked and not allowed through.

The service-selector credential can also be utilized to determine how the wireless signal will be routed within the mobility network. The service selector can select an egress point (interface) from the mobility network to the Internet. The service-selector can establish a logical wireless signal path from the PBX wireless-modem to the selected egress point, wherein the logical path can comprise self healing and re-routing capabilities that increase the overall reliability of the wireless network. This path can tolerate various failures in the mobility network and still maintain service. Therefore, the initial processing can authenticate the user (i.e. PBX) and authenticate the user's access to the specified service-selector. Also, the service selector can establish a logical path from the PBX to the mobility cloud egress interface.

The PBX wireless-modem can convert the wireline signal to a wireless signal to be sent to the mobility cloud. The wireless signal can then be routed through the mobility network to a pre-determined egress point. That egress point can be determined by the service-selector credential sent earlier by the PBX. At the egress point, the mobility cloud can convert the wireless signal back to a wireline signal and send the wireline signal to the VIG. The egress point can be unique in the mobility cloud, wherein a particular stream can be forced to exit thru a particular interface. This, in turn, can increase overall security as the voice signal can be directed to reach a particular VIG (out of a set of VIGs) thus not allowing the voice signals from different PBXs (enterprises) to be mixed.

Utilizing a configurable network router in conjunction with a cellular network of a mobility service provider identity can improve SIP trunking efficiencies. Internet protocol addresses can be utilized based on secure private branch exchange access to the mobility service provider identity. Described herein are systems, methods, articles of manufacture, and other embodiments or implementations that can facilitate usage of SIP trunking over a cellular network. The various embodiments can be implemented in connection with any type of device with a connection to a communications network (e.g., a wireless communications network, the Internet, or the like), such as a mobile handset, a computer, a handheld device, or the like.

SIP trunking service can be provided over cellular connectivity including, but not limited to, long-term evolution (LTE). Although wireline connectivity can be provided over a cellular network, trunk side connectivity can be provided over LTE. However, SIP trunking service over wireline connectivity can suffer from long and difficult recovery in disaster recovery scenarios and extended implementation times. Implementing SIP trunking over LTE can facilitate more efficient deployment and a more efficient recovery. By mobilizing the SIP trunk (using cellular connectivity) the recovery times and implementation times can be reduced.

To support this approach a router, including but not limited to a NetGate router, with an LTE modem can establish connectivity from a mobile service provider (mobility network) to a private branch exchange network. The router can support multiple local area network (LAN) ports via an Ethernet connection. An Internet protocol private broadcast exchange (IP-PBX) can communicate with one LAN or sub-network and IP devices including, but not limited to, telephones and can communicate with another LAN port. The router can support cellular modem devices and store data related to all of the sub-networks that are communicating with the router. Although SIP signaling is done by the IP-PBX in IP telephony, the data-flow (voice over IP) can be directed to a different destination such as plain old telephones or IP phones. The router, via a cellular modem, can either originate calls or accept calls. Services can also be designed specifically for call origination only. For example, if an application queries a database, then a call origination only mode of operation can provide additional security. However, both IP streams, signaling and data can arrive over the same IP security tunnel to the router. Thus, the router can send specific IP data to selected destinations.

Additionally, the router can manage the IP devices remotely. Router management of the IP devices can include, but is not limited to, provisioning of the IP devices, updating the IP devices, adding service to the IP devices, and/or removing service from the IP devices. Furthermore, a router console can be used for troubleshooting and local management. For example, the router console can allow for viewing of log files that normal users do not have access to.

The mobility network can enable data, such as voice over IP, to travel through multiple selected paths, thus providing redundancy. The redundancy can improve the overall network service reliability. The system can provide enhanced security measures including, but not limited to, selecting a range of IP addresses. The IP-PBX and all its subtending IP devices can be the only devices that can use the data path as a closed user group. As another security measure, the system can also check to validate that a user from the PBX is allowed to use cellular services.

The cellular network can allocate IP addresses to devices that want to use its services. A range of IP addresses can be allocated to a specific enterprise. When a device, which belongs to that specific enterprise, requests a service, the device can receive an IP address from a selected range. This methodology can increase security because the firewall, at the virtual internet gateway (VIG), can know to only allow IP streams with IP addresses from the specific range. For example, once a cellular modem is powered-up, credentials including, but not limited to, a user identification and/or a service selector, can be sent to the wireless provider's mobility network as an access point name (APN). The service-selector can communicate to the mobility network to select the range of the IP addresses to be allocated. However, before the IP address is sent to the modem, the mobility network can check the user identification to ensure that the user is indeed entitled to use the service selector. Once all of the security checks are complete, the IP address of the correct range can be sent to the modem.

SIP trunking over LTE can also provide higher security by encrypting the cellular path via the cellular modem. The cellular modem, which can be a component of the router, can be provisioned with credentials that allow it to connect to the mobility network. Once the credential checks are performed and determined to be successful, one or more IP addresses, set by the mobility network provider, can be allocated to the cellular modem. These IP addresses can belong only to the cellular modem. Once the cellular modem receives the IP addresses, the cellular modem can establish a packet data protocol tunnel to the mobility network. Thus the data, from this point, can be sent through the packet data protocol tunnel. An IPSec (IP security) tunnel can also facilitate secure communication from the router to the mobility network. The IP security tunnel can begin at the router, which can be before the cellular modem, and can end at the VIG of the service provider.

The VIG can serve as the entry point from the mobility provider's network into the Internet. Additionally, the VIG can serve as the termination point of the IP security tunnel, which can exist between the router and VIG. Data passed between the router and the VIG can be encrypted. The VIG can provide customers with data services as opposed to voice services. The VIG can also be aware of selective data flows that arrive from pre-determined routers and can know to provide service only to specific routers that are pre-provisioned with the mobility provider's data service. The service, connecting IP-PBXs to the mobility provider, although voice-based, can be facilitated by the router to VIG connection. Thus, a private branch exchange network can increase topology reliability and maintain wireline and wireless connections simultaneously.

An outbound call from the IP-PBX can initiate from a subtending phone, where the IP-PBX can call a PSTN. The request can be sent by the IP-PBX to the router. The router can convert the request to cellular data and send it to a mobility cloud. The mobility cloud can convert the cellular data back to wireline data and send the request to the VIG. The VIG can then send the request via a permanent virtual connection (PVC) to a Voice over IP (VoIP) cloud which determines that the call is destined for a PSTN phone and convert it to PSTN format of signaling system no. 7 (SS7) and send it to the right network. The VoIP can comprise a business VoIP or the like.

An inbound call to the IP-PBX can be initiated from a PSTN phone call to an IP phone. A request can be sent to a VoIP network cloud, which can convert the phone call from SS7 to IP. The SIP/IP request can be sent to the VIG, and the VIG can send it to the mobility network, which converts the wireline signal data to cellular signal data and sends it to the PBX router. After receiving the request, the PBX router can convert the cellular signal data back to wireline signal data and send it to the IP-PBX. The IP-PBX can then send the request to a device associated with the PBX network.

In one embodiment, described herein is a system that can facilitate a router receiving first wireline signal data from a device associated with a private branch exchange device. The router can convert the first wireline signal data to cellular signal data and then send the cellular signal data to a virtual Internet gateway device via an Internet protocol security tunnel. The system can also facilitate a storing of Internet protocol address data. The system can include a display component and one or more servers in a cloud-computing environment that can store information about cellular data and/or Internet protocol addresses.

According to another embodiment, described herein is a method for converting cellular signal data to wireline signal data to be carried by a wireline to a user device associated with a private branch exchange device. Prior to converting the cellular signal data, the cellular signal data and Internet protocol address data can be received by a wireless router.

According to yet another embodiment, an article of manufacture, such as a computer readable storage medium or the like, can store instructions that, when executed by a computing device, can facilitate receiving cellular signal data from a virtual internet gateway device and converting the cellular signal data to wireline signal data. The wireline signal data can then be sent to another device using an Internet protocol. These and other embodiments or implementations are described in more detail below with reference to the drawings.

Referring now to FIG. 1, illustrated is an example system of a PBX router converting wireline signal data to cellular signal data. For an outgoing call from a PBX network 100 device, wireline signal data can be sent 102 to a PBX router 104 associated with the PBX network 100. The PBX router 104 can comprise a modem to facilitate conversion of the wireline signal data to cellular signal data. The modem can facilitate wireline signal data to cellular signal data conversions and cellular signal data to wireline signal data conversions. The cellular signal data can be sent 106 to a mobility network 108 associated with a mobility service provider identity. The mobility service provider can convert the cellular signal to a wireline signal and then send 110 the cellular signal over the Internet 112, which can transmit 114 the cellular signal to a virtual internet gateway 116 associated with the mobile service provider identity. The virtual Internet gateway 116 can then decrypt the signal to another wireline signal and send 118 the other wireline signal, which is representative of the original wireline signal, to a router 120 associated with the service provider.

Figure 2:
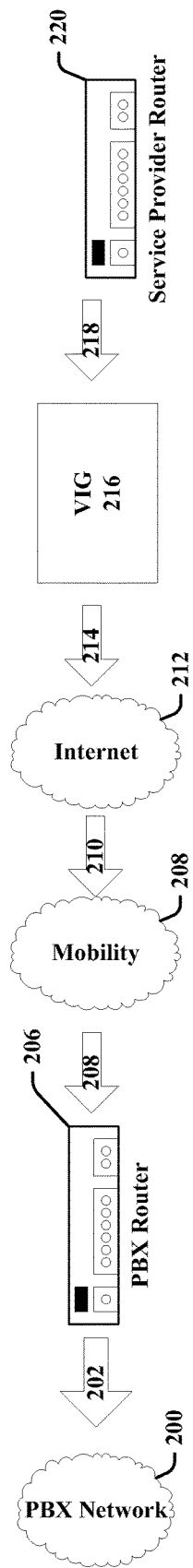
FIG. 2 illustrates an example system for a mobility cloud device converting wireline signal data to cellular signal data.

Referring now to FIG. 2, illustrated is an example system for a virtual Internet gateway encrypting incoming signal data and forwarding to the Internet cloud. An incoming call to a PBX network 200 can begin from a service provider router 220 sending 218 wireline signal data to a virtual Internet gateway 216 associated with a service provider identity. The virtual Internet gateway 216 can encrypt the wireline signal data and send 214 the cellular signal data to a mobility network 208, where the wireline signal to wireless signal conversion takes place, via the Internet 212. The Internet 212 can send 210 the wireline signal data to the mobility network 210 prior to sending 208 the cellular signal data to a PBX router 206 associated with at PBX network. The PBX router 206 can then convert the cellular signal data to other wireline signal data representative of the wireline signal data from the service provider router 220. A modem associated with the PBX router 206 can facilitate the cellular to wireline signal data conversion. The modem can facilitate wireline signal data to cellular signal data conversions and cellular signal data to wireline signal data conversions. The other wireline signal data can then be sent 202 to the PBX network 200 and a device associated with the PBX network 200.

Figure 3:
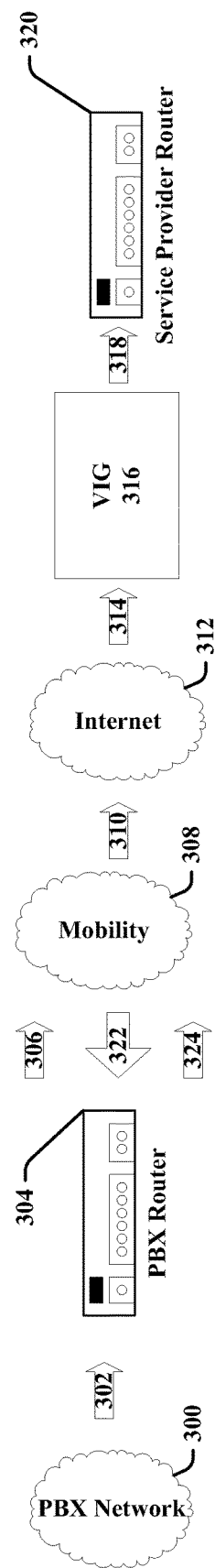
FIG. 3 illustrates an example system for allocating internet protocol addresses based on communication between a PBX router and a mobility service provider identity.

Referring now to FIG. 3, illustrated is an example system for allocating internet protocol addresses based on communication between a PBX router and a mobility service provider identity. A call can be initiation from a device associated with a PBX network 300. The PBX network 300 can send 302 wireline data associated with the call to a PBX router 304 associated with the PBX network 300. The PBX router 304 can comprise a modem to facilitate wireline data to cellular data conversions and cellular data to wireline data conversions.

The mobility network 308 can allocate IP addresses to devices that want to use its services. A range of IP addresses can be allocated to the PBX network 300. When a device, which belongs to the PBX network 300, requests a service, the device can receive an IP address from a selected range. When the modem associated with the PBX router 304 is powered-up, credentials including, but not limited to, a user identification and/or a service selector, can be sent 306 to the wireless provider's mobility network 308 as an access point name (APN). The service-selector can communicate to the mobility network 308 which range of the IP addresses can be allocated. However, before the IP address is sent to the modem, the mobility network 308 can check the user identification to ensure that the user is indeed entitled to use the service selector. Once all security checks are complete, the IP address of the correct range can be sent 322 to the modem. These IP addresses can belong only to the cellular modem. Once the cellular modem receives the IP addresses, the cellular modem can establish a packet data protocol tunnel to the mobility network 308.

After wireline signal data has been converted to cellular signal data by the PBX router 304, the cellular signal data can then be sent 324 through the packet data protocol tunnel. The mobility network 308 can send 310 the cellular signal data over the Internet 312, which will convert the wireless signal to wireline signal and send 314 the wireline signal data to a virtual internet gateway 316 associated with the mobile service provider identity. The virtual Internet gateway 316 can then decrypt the wireline signal data and send 318 the decrypted wireline signal data, which is representative of the original wireline signal data, to a router 320 associated with the service provider.

Figure 4:
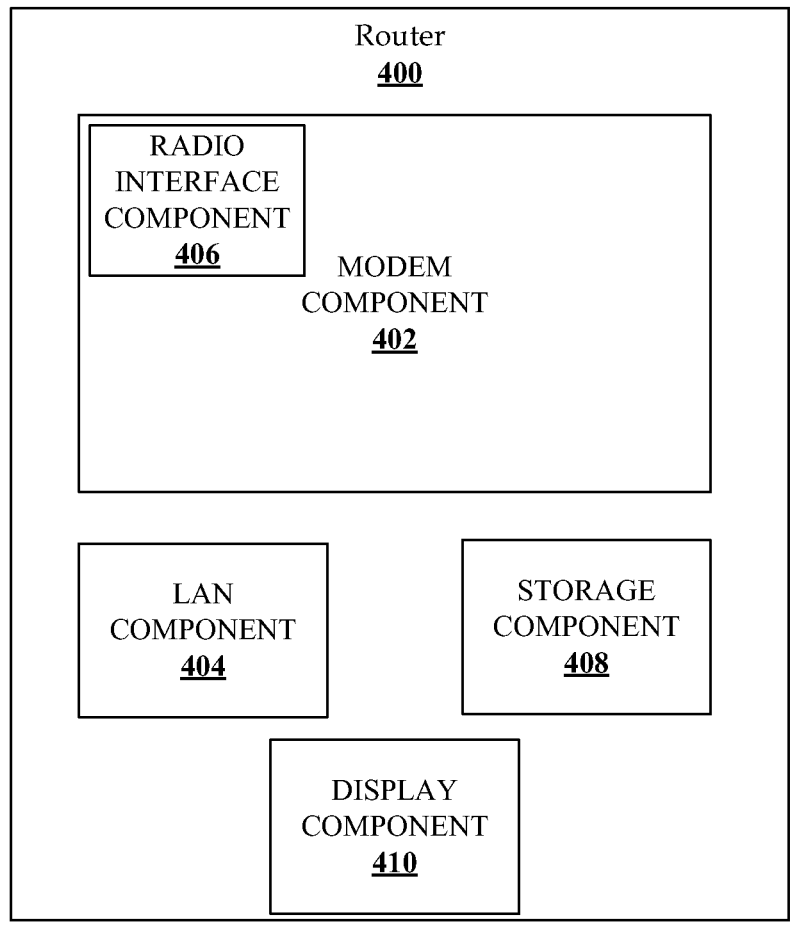
FIG. 4 illustrates an example apparatus of a router.

Referring now to FIG. 4, illustrated is an example apparatus of a router 400. The router 400 can comprise several components to assist in the signal conversion process. A modem component 402 can be included with the router 400 to facilitate establishing connectivity from a mobility network to a private branch exchange network. The modem component 402 can comprise a radio interface component 406 for sending and receiving cellular signals. The router 400 can support multiple local area network (LAN) ports 404 via Ethernet connectivity. The storage component 408 can store data including, but not limited to, IP addresses, user identification, devices associated with the PBX network, and/or cellular/wireline signal data. The display component 410 can allow for user interaction and/or management of the router 400. For instance, the display component 410 can allow a secure user to view log files that other PBX network users do not have access to.

Figure 5:
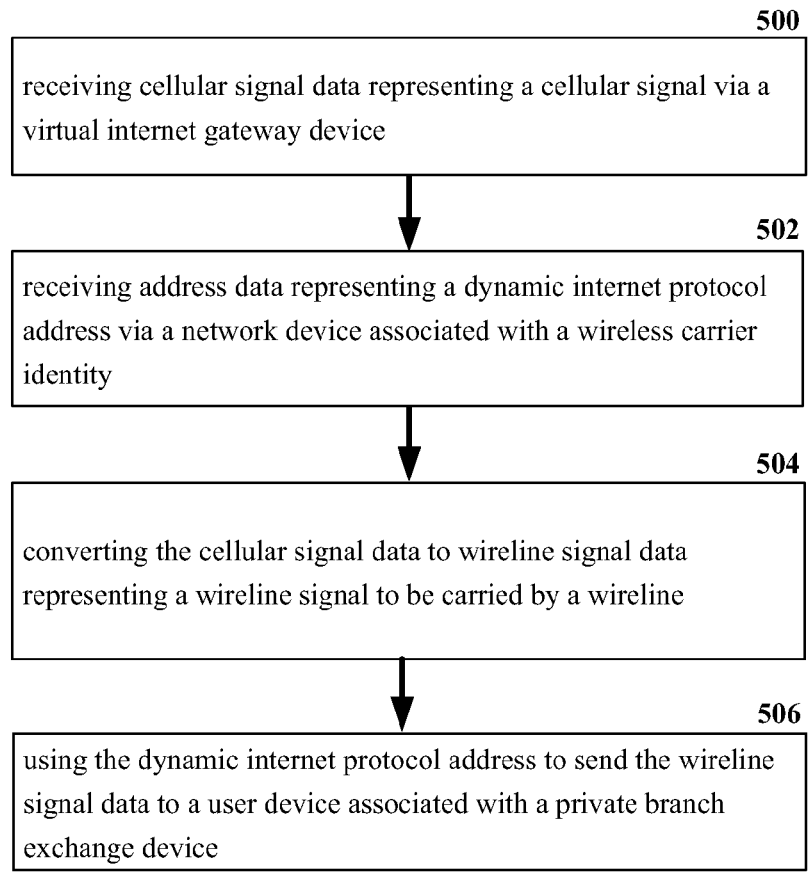
FIG. 5 illustrates an example flow diagram of a method for receiving and converting cellular signal data to wireline signal data.

Referring now to FIG. 5, illustrated is an example flow diagram of a method for receiving and converting cellular signal data to wireline signal data. At element 500, a mobility cloud device, or a similar device, can receive cellular signal data representing a cellular signal via a virtual Internet gateway device. The mobility cloud device can also receive address data representing an Internet protocol address via a network device associated with a wireless carrier identity at element 502. A wireless router, or like device, can comprise a modem component to facilitate communication with the wireless carrier identity radio interface component. At element 504, the mobility cloud device can convert the cellular signal data to wireline signal data representing a wireline signal to be carried by a wireline. The mobility cloud device can then forward the wireline signal data to the wireless router via the modem component. At element 506, the wireless router can use the dynamic Internet protocol address to send the wireline signal data to a user device associated with a private branch exchange.

Figure 6:
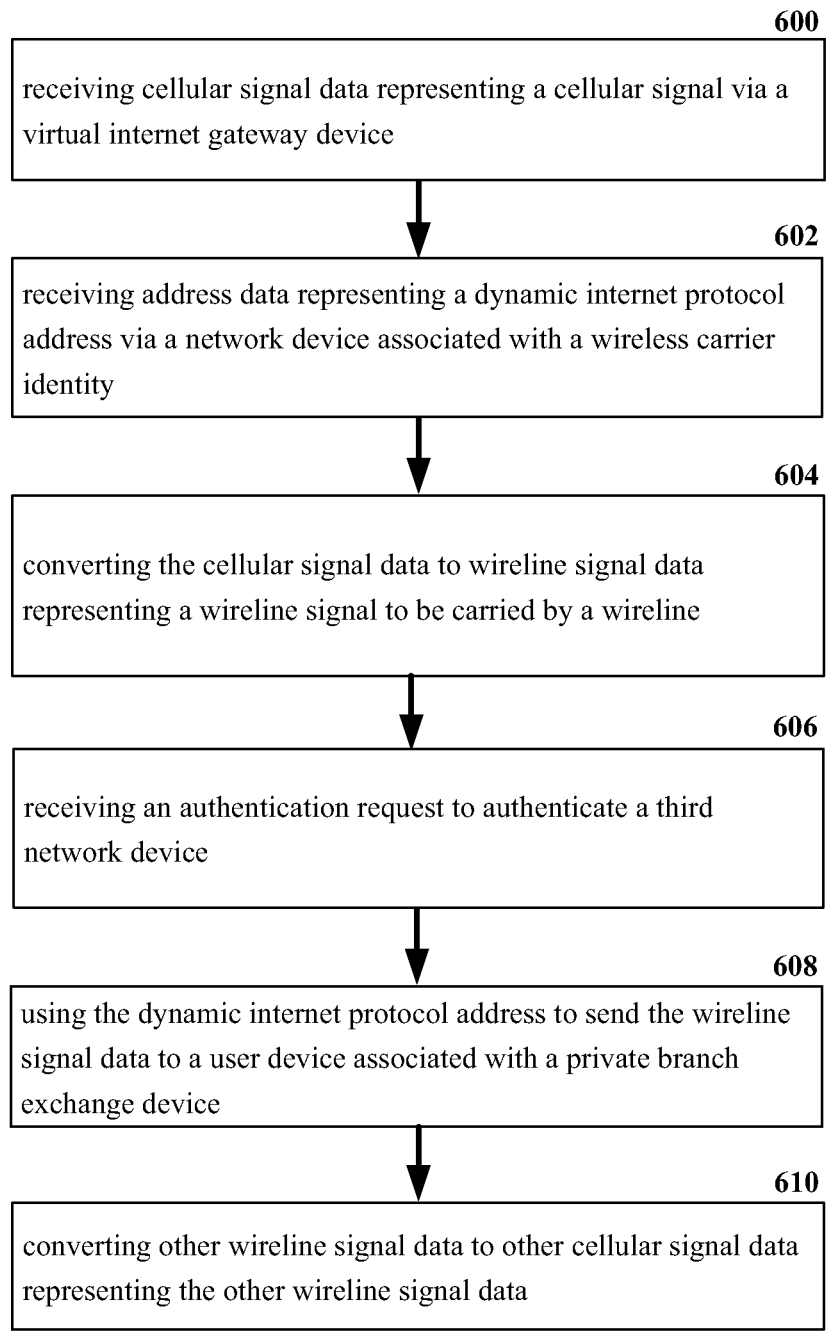
FIG. 6 illustrates an example flow diagram of a method for receiving and converting cellular signal data to wireline signal data and converting other cellular signal data to other wireline signal data.

Referring now to FIG. 6, illustrated is an example flow diagram of a method for receiving and converting cellular signal data to wireline signal data and converting other cellular signal data to other wireline signal data. At element 600, a mobility cloud device, or a similar device, can receive cellular signal data representing a cellular signal via a virtual Internet gateway device. The mobility cloud device can also receive address data representing an Internet protocol address via a network device associated with a wireless carrier identity at element 602. A wireless router can comprise a modem component to facilitate communication with the wireless carrier identity radio interface component. At element 604, the mobility cloud device can convert the cellular signal data to wireline signal data representing a wireline signal to be carried by a wireline. The mobility cloud device can then forward the wireline signal data to the wireless router via the modem component. At element 606, the wireless router can use the dynamic Internet protocol address to send the wireline signal data to a user device associated with a private branch exchange. The mobility cloud device can convert other wireline signal data to other cellular signal data representing the other wireline signal data at element 608.

Figure 7:
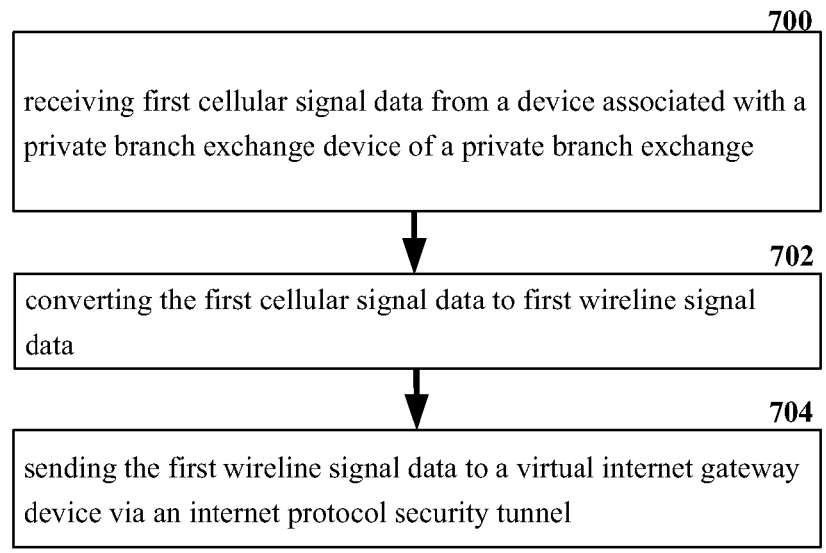
FIG. 7 illustrates an example flow diagram of a system for sending cellular signal data to a virtual internet gateway as wireline signal data.

Referring now to FIG. 7, illustrated is an example flow diagram of a system for sending cellular signal data to a virtual Internet gateway as wireline signal data. A public broadcast exchange device can send wireline signal data to router associated with the public broadcast exchange. The router can convert the wireline signal data to cellular signal data and send the cellular signal data to a mobility cloud device. At element 700 the system can receive first cellular signal data from a device associated with a private branch exchange device of a private branch exchange. At element 702 the system can converting the first cellular signal data to first wireline signal data, and the first wireline signal data can be sent to a virtual Internet gateway device via an internet protocol security tunnel at element 704.

Figure 8:
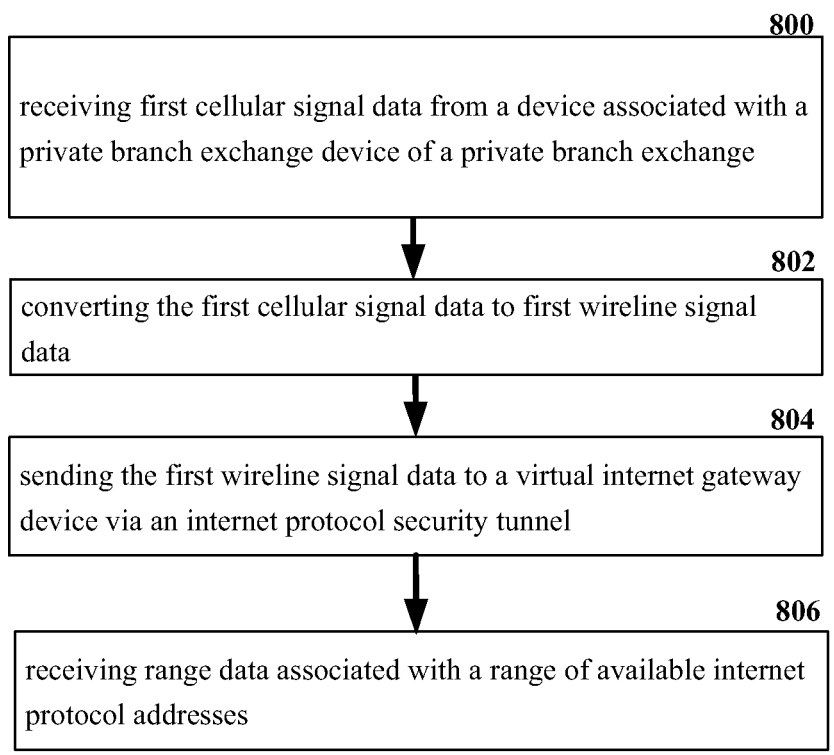
FIG. 8 illustrates an example flow diagram of a system for sending cellular signal data to a virtual internet gateway as wireline signal data and receiving a range of available internet protocol addresses.

Referring now to FIG. 8, illustrated is an example flow diagram of a system for sending cellular signal data to a virtual Internet gateway as wireline signal data and receiving a range of available Internet protocol addresses. A public broadcast exchange device can send wireline signal data to router associated with the public broadcast exchange. The router can convert the wireline signal data to cellular signal data and send the cellular signal data to a mobility cloud device. At element 800 the system can receive first cellular signal data from a device associated with a private branch exchange device of a private branch exchange. At element 802 the system can converting the first cellular signal data to first wireline signal data, and the first wireline signal data can be sent to a virtual Internet gateway device via an internet protocol security tunnel at element 804. At element 806 the system can receive range data associated with a range of available Internet protocol addresses.

The system can provide enhanced security measures including, but not limited to, selecting a range of IP addresses. The IP-PBX and all its subtending IP devices can be the only devices that can use the data path as a closed user group. The cellular network can allocate IP addresses to PBX devices. A range of IP addresses can be allocated to the PBX network thereby increasing security because the firewall, at the VIG, can know to only allow IP streams with IP addresses from the specific range.

Figure 9:
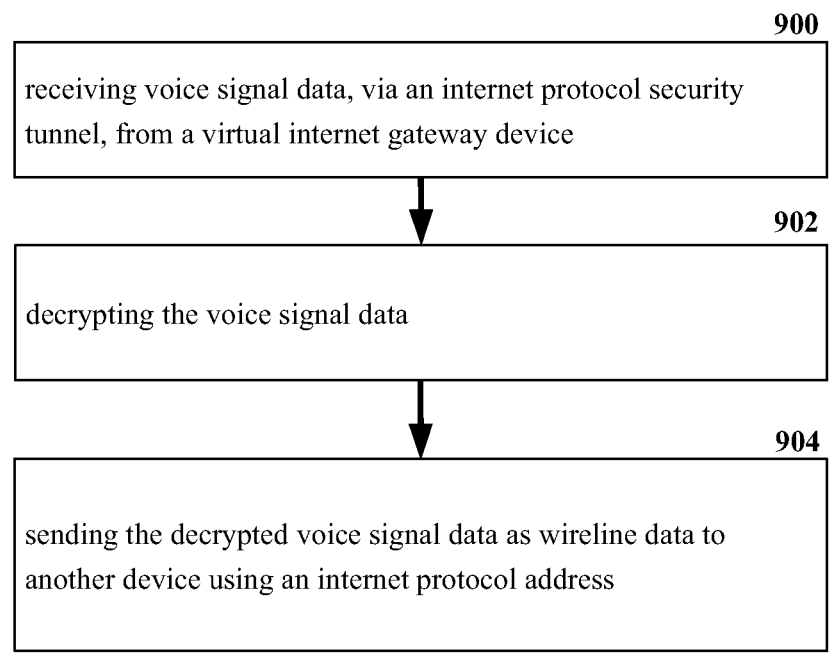
FIG. 9 illustrates an example flow diagram of a computer readable storage medium for receiving voice signal data and decrypting the voice signal data to wireline signal data.

Referring now to FIG. 9, illustrated is an example flow diagram of a computer readable storage medium for receiving voice signal data and decrypting the voice signal data to wireline signal data. At element 900 a device can receive voice signal data, via an Internet protocol security tunnel, from a virtual Internet gateway device. The virtual Internet gateway device can serve as the entry point from the mobility provider's network into the Internet. Additionally, the virtual Internet gateway device can serve as the termination point of the IP security tunnel, which can exist between the router and the virtual Internet gateway device. Data passed between the router and the virtual Internet gateway device can be encrypted. The virtual Internet gateway device can provide customers with data services as opposed to voice services. Furthermore, the mobility cloud device can convert voice signal data to wireline signal data and wireline signal data to voice signal data. Therefore, at element 902, a mobility cloud device can convert voice signal data to wireline signal data. The mobility cloud device can also be aware of selective data flows that arrive from pre-determined routers and can know to provide service only to specific routers that are pre-provisioned with the mobility provider's data service. The service, connecting IP-PBXs to the mobility provider, although voice-based, can be facilitated by the router to virtual Internet gateway device connection.

Once the wireless router has decrypted the wireline signal data, the wireless router can send the wireline signal data to another device using an Internet protocol address at element 904. A range of IP addresses can be allocated to the PBX network thereby increasing security because the firewall, at the VIG, can know to only allow IP streams with IP addresses from the specific range. A cellular network can allocate IP addresses to PBX network devices. The IP-PBX and all its subtending IP devices can then be the only devices that can use the IP address path as a closed user group.

Figure 10:
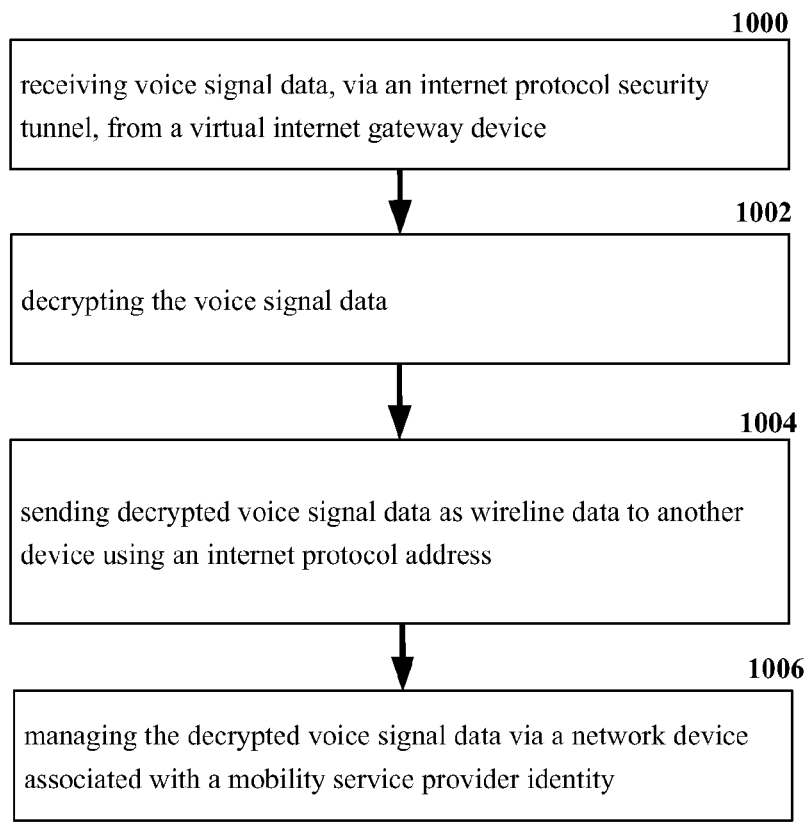
FIG. 10 illustrates an example flow diagram of a computer readable storage medium for receiving voice signal data and decrypting the voice signal data to wireline signal data, and managing the cellular signal data via a mobility network device.

Referring now to FIG. 10, illustrated is an example flow diagram of a computer readable storage medium for receiving encrypted voice signal data, decrypting voice signal data to wireline signal data, and managing the voice signal data via a mobility network device. At element 1000 a mobility cloud device can receive encrypted wireline signal data via an Internet protocol security tunnel. A virtual Internet gateway device can serve as the entry point from the mobility provider's network into the Internet. Additionally, the virtual Internet gateway device can serve as the termination point of the IP security tunnel, which can exist between the router and the virtual Internet gateway device. Data passed between the router and the virtual Internet gateway device can be encrypted. The virtual Internet gateway device can provide customers with data services as opposed to voice services. Therefore, at element 1002, voice signal data can be decrypted. The virtual internet gateway device can also be aware of selective data flows that arrive from predetermined routers and can know to provide service only to specific router that are pre-provisioned with the mobility provider's data service. The service, connecting IP-PBXs to the mobility provider, although voice-based, can be facilitated by the router to virtual Internet gateway device connection.

At element 1002, decrypted wireline voice signal data can be sent to a device using an Internet protocol address at element 1004. An IP address from a specific range of IP addresses can be allocated to the PBX network thereby increasing security because the firewall, at the VIG, can know to only allow IP streams with IP addresses from the specific range. A cellular network can allocate IP addresses to PBX network devices. The IP-PBX and all its subtending IP devices can then be the only devices that can use the IP address path as a closed user group.

At element 1006 the device can manage the voice signal data via a network device associated with the mobility provider's identity. The device can manage the IP devices remotely. Management of the IP devices can include, but is not limited to, provisioning the IP devices, updating the IP devices, adding service to the IP devices, and/or removing service from the IP devices.

Figure 11:
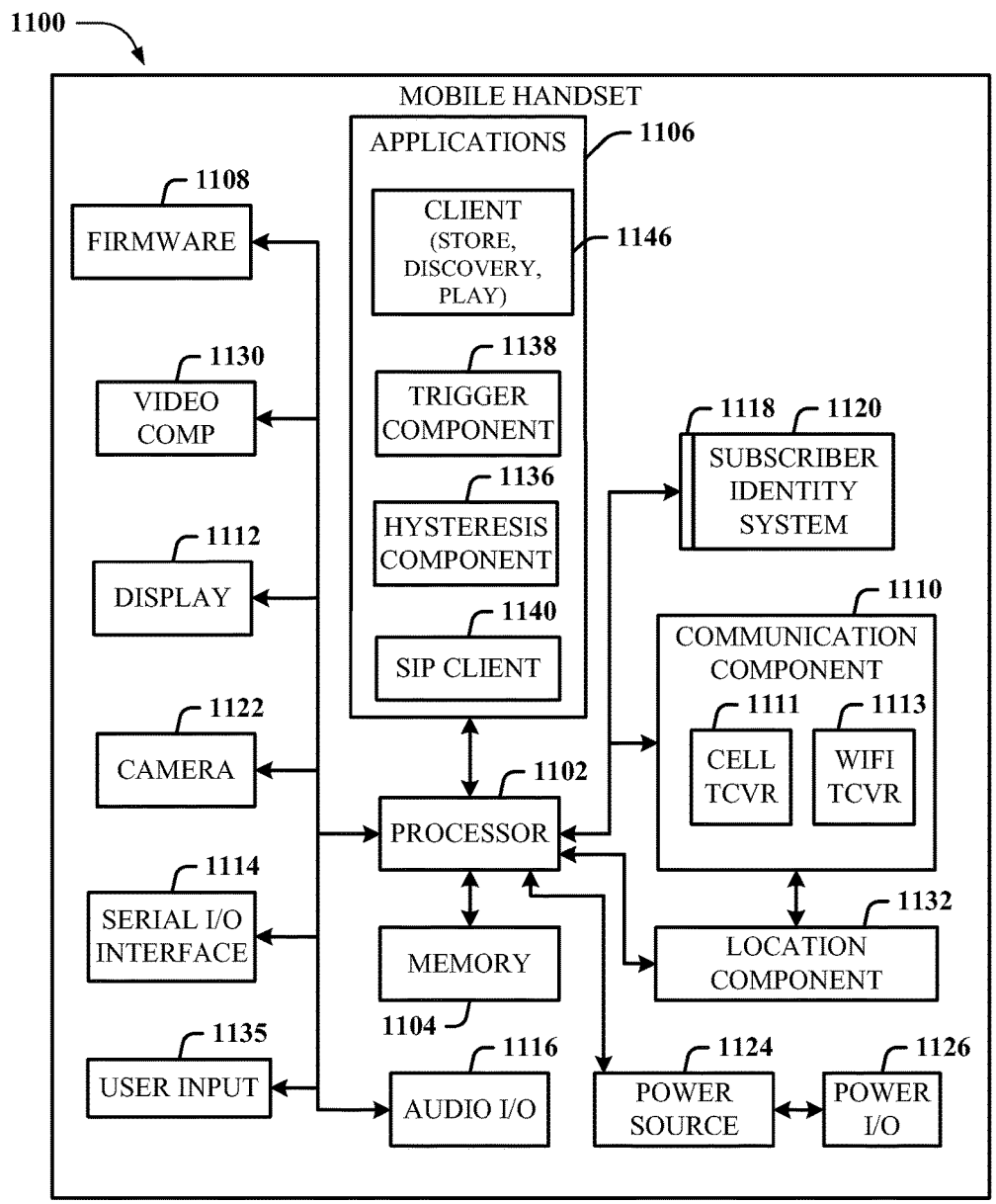
FIG. 11 illustrates a block diagram of an example mobile handset operable to engage in a system architecture that facilitates secure wireless communication according to the embodiments described herein.

Referring now to FIG. 11, illustrated is a schematic block diagram of an exemplary end-user device such as a mobile device 1100 capable of connecting to a network in accordance with some embodiments described herein. Although a mobile handset 1100 is illustrated herein, it will be understood that other devices can be a mobile device, and that the mobile handset 1100 is merely illustrated to provide context for the embodiments of the innovation described herein. The following discussion is intended to provide a brief, general description of an example of a suitable environment 1100 in which the various embodiments can be implemented. While the description includes a general context of computer-executable instructions embodied on a computer readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of computer-readable media. Computer readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1100 includes a processor 1102 for controlling and processing all onboard operations and functions. A memory 1104 interfaces to the processor 1102 for storage of data and one or more applications 1106 (e.g., a video player software, user feedback component software, etc.). Other applications can include voice recognition of predetermined voice commands that facilitate initiation of the user feedback signals. The applications 1106 can be stored in the memory 1104 and/or in a firmware 1108, and executed by the processor 1102 from either or both the memory 1104 or/and the firmware 1108. The firmware 1108 can also store startup code for execution in initializing the handset 1100. A communications component 1110 interfaces to the processor 1102 to facilitate wired/wireless communication with external systems, e.g., cellular networks, VoIP networks, and so on. Here, the communications component 1110 can also include a suitable cellular transceiver 1111 (e.g., an LTE transceiver) and/or an unlicensed transceiver 1113 (e.g., WiFi, WiMax) for corresponding signal communications. The handset 1100 can be a device such as a cellular telephone, a PDA with mobile communications capabilities, and messaging-centric devices. The communications component 1110 also facilitates communications reception from terrestrial radio networks (e.g., broadcast), digital satellite radio networks, and Internet-based radio services networks.

The handset 1100 includes a display 1112 for displaying text, images, video, telephony functions (e.g., a Caller ID function), setup functions, and for user input. For example, the display 1112 can also be referred to as a "screen" that can accommodate the presentation of multimedia content (e.g., music metadata, messages, wallpaper, graphics, etc.). The display 1112 can also display videos and can facilitate the generation, editing and sharing of video quotes. A serial I/O interface 1114 is provided in communication with the processor 1102 to facilitate wired and/or wireless serial communications (e.g., USB, and/or IEEE 1394) through a hardwire connection, and other serial input devices (e.g., a keyboard, keypad, and mouse). This supports updating and troubleshooting the handset 1100, for example. Audio capabilities are provided with an audio I/O component 1116, which can include a speaker for the output of audio signals related to, for example, indication that the user pressed the proper key or key combination to initiate the user feedback signal. The audio I/O component 1116 also facilitates the input of audio signals through a microphone to record data and/or telephony voice data, and for inputting voice signals for telephone conversations.

The handset 1100 can include a slot interface 1118 for accommodating a SIC (Subscriber Identity Component) in the form factor of a card Subscriber Identity Module (SIM) or universal SIM 1120, and interfacing the SIM card 1120 with the processor 1102. However, it is to be appreciated that the SIM card 1120 can be manufactured into the handset 1100, and updated by downloading data and software.

The handset 1100 can process IP data traffic through the communication component 1110 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 1122 (e.g., a camera) can be provided for decoding encoded multimedia content. The video processing component 1122 can aid in facilitating the generation, editing and sharing of video quotes. The handset 1100 also includes a power source 1124 in the form of batteries and/or an AC power subsystem, which power source 1124 can interface to an external power system or charging equipment (not shown) by a power I/O component 1126.

The handset 1100 can also include a video component 1130 for processing video content received and, for recording and transmitting video content. For example, the video component 1130 can facilitate the generation, editing and sharing of video quotes. A location tracking component 1132 facilitates geographically locating the handset 1100. As described hereinabove, this can occur when the user initiates the feedback signal automatically or manually. A user input component 1134 facilitates the user initiating the quality feedback signal. The user input component 1134 can also facilitate the generation, editing and sharing of video quotes. The user input component 1134 can include such conventional input device technologies such as a keypad, keyboard, mouse, stylus pen, and/or touch screen, for example.

Referring again to the applications 1106, a hysteresis component 1136 facilitates the analysis and processing of hysteresis data, which is utilized to determine when to associate with the access point. A software trigger component 1138 can be provided that facilitates triggering of the hysteresis component 1138 when the Wi-Fi transceiver 1113 detects the beacon of the access point. A SIP client 1140 enables the handset 1100 to support SIP protocols and register the subscriber with the SIP registrar server. The applications 1106 can also include a client 1142 that provides at least the capability of discovery, play and store of multimedia content, for example, music.

The handset 1100, as indicated above related to the communications component 810, includes an indoor network radio transceiver 1113 (e.g., Wi-Fi transceiver). This function supports the indoor radio link, such as IEEE 802.11, for the dual-mode LTE handset 1100. The handset 1100 can accommodate at least satellite radio services through a handset that can combine wireless voice and digital radio chipsets into a single handheld device.

Figure 12:
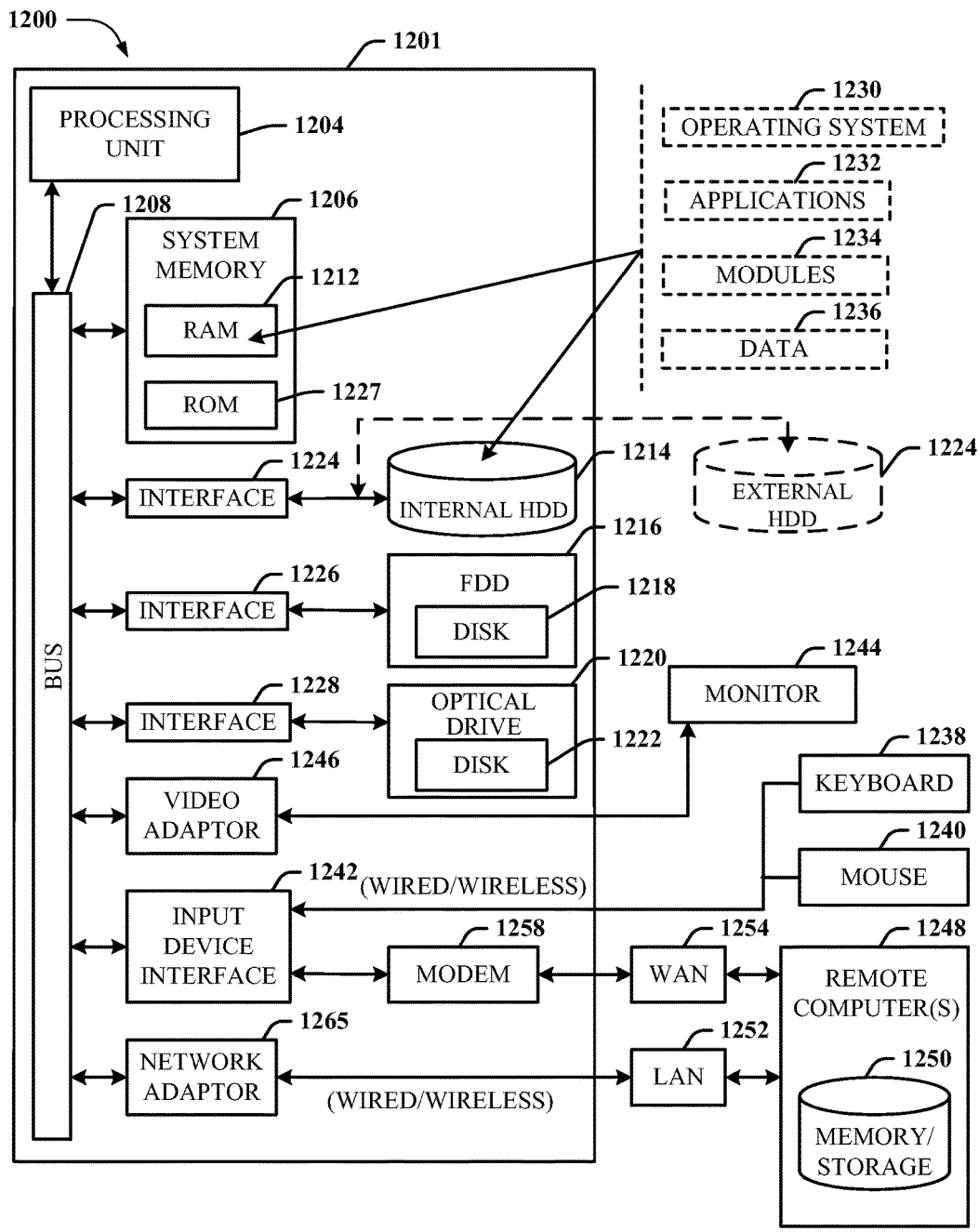
FIG. 12 illustrates a block diagram of an example computer operable to engage in a system architecture that facilitates secure wireless communication according to the embodiments described herein.

Referring now to FIG. 12, there is illustrated a block diagram of a computer 1200 operable to execute a system architecture that facilitates establishing a transaction between an entity and a third party. The computer 1200 can provide networking and communication capabilities between a wired or wireless communication network and a server and/or communication device. In order to provide additional context for various aspects thereof, FIG. 12 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, handheld computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 12, implementing various aspects described herein with regards to the end-user device can include a computer 1200, the computer 1200 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes read-only memory (ROM) 1210 and random access memory (RAM) 1212. A basic input/output system (BIOS) is stored in a non-volatile memory 1210 such as ROM, EPROM, EEPROM, which BIOS contains the basic routines that help to transfer information between elements within the computer 1200, such as during start-up. The RAM 1212 can also include a high-speed RAM such as static RAM for caching data.

The computer 1200 further includes an internal hard disk drive (HDD) 1214 (e.g., EIDE, SATA), which internal hard disk drive 1214 can also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1211 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1294 interface technologies. Other external drive connection technologies are within contemplation of the subject innovation.

The drives and their associated computer-readable media provide nonvolatile storage of data, data structures, computer-executable instructions, and so forth. For the computer 1200 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1200, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is to be appreciated that the innovation can be implemented with various commercially available operating systems or combinations of operating systems.

A user can enter commands and information into the computer 1200 through one or more wired/wireless input devices, e.g., a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 2394 serial port, a game port, a USB port, an IR interface, etc.

A monitor 1244 or other type of display device is also connected to the system bus 1208 through an interface, such as a video adapter 1246. In addition to the monitor 1244, a computer 1200 typically includes other peripheral output devices (not shown), such as speakers, printers, etc.

The computer 1200 can operate in a networked environment using logical connections by wired and/or wireless communications to one or more remote computers, such as a remote computer(s) 1248. The remote computer(s) 1248 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which may connect to a global communications network, e.g., the Internet.

When used in a LAN networking environment, the computer 1200 is connected to the local network 1252 through a wired and/or wireless communication network interface or adapter 1256. The adapter 1256 may facilitate wired or wireless communication to the LAN 1252, which may also include a wireless access point disposed thereon for communicating with the wireless adapter 1256.

When used in a WAN networking environment, the computer 1200 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 through the serial port interface 1242. In a networked environment, program modules depicted relative to the computer, or portions thereof, can be stored in the remote memory/storage device 1250. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least WiFi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   receiving, by a network device comprising a processor, cellular signal data representing a cellular signal via a virtual internet gateway device;
   receiving, by the network device, address data representing an internet protocol address via a network device associated with a wireless carrier identity;
   converting, by the network device, the cellular signal data to wireline signal data representing a wireline signal to be carried by a wireline;
   using the internet protocol address to send, by the network device, the wireline signal data to a user device associated with a private branch exchange device, and
   in response to a condition associated with the internet protocol address being determined to have been satisfied, associating, by the network device, the internet protocol address with a wireless router for transmission of a voice signal.

2. The method of claim 1, wherein the wireline signal data is first wireline signal data, wherein the cellular signal data is first cellular signal data, and wherein the method further comprises:
   converting, by the network device, second wireline signal data to second cellular signal data associated with the second wireline signal data.

3. The method of claim 2, wherein the second cellular signal data is sent to a wireless carrier device.

4. The method of claim 1, wherein the wireline signal data representing the wireline signal is first wireline signal data representing a first wireline signal, and wherein second wireline signal data representing a second wireline signal is converted to the cellular signal data prior to being received by the wireless router.

5. The method of claim 1, wherein the cellular signal data is encrypted.

6. The method of claim 1, wherein the cellular signal data comprises data associated with voice data formatted according to a voice over internet protocol.

7. The method of claim 1, further comprising:
   selecting, by the network device, internet protocol address data representing internet protocol addresses associated with the private branch exchange device.

8. A system, comprising:
   a processor; and
   a memory that stores executable instructions that, when executed by the processor, facilitate performance of operations, comprising:
      receiving first cellular signal data from a device associated with a private branch exchange device of a private branch exchange;
      converting the first cellular signal data to first wireline signal data;
      sending the first wireline signal data to a virtual internet gateway device via an internet protocol security tunnel, and
      in response to a condition associated with an internet protocol address being determined not to have been satisfied, facilitating blocking the internet protocol address via the virtual internet gateway device to prevent a voice signal transmission.

9. The system of claim 8, wherein the first cellular signal data is converted into second wireline signal data via a network device.

10. The system of claim 8, wherein the virtual internet gateway device decrypts the first wireline signal data.

11. The system of claim 8, wherein the operations further comprise:
    establishing a packet data protocol tunnel between an interface, associated with the system, and the virtual internet gateway device.

12. The system of claim 8, wherein the operations further comprise:
    requesting the internet protocol address from a range of pre-selected internet protocol addresses associated with a range of available internet protocol addresses.

13. The system of claim 12, wherein the operations further comprise:
    allocating an available internet protocol address, of the range of available internet protocol addresses, to the private branch exchange via a network device.

14. The system of claim 13, wherein the operations further comprise:
    sending second wireline signal data via the available internet protocol address, that was allocated to the private branch exchange device.

15. A machine-readable storage medium, comprising executable instructions that, when executed by a processor, facilitate performance of operations, comprising
    receiving voice signal data, via an internet protocol security tunnel, from a virtual internet gateway device;
    converting decrypted voice signal data to first wireline signal data;
    sending the first wireline signal data to a device using a first internet protocol address;
    in response to a condition associated with the first internet protocol address being determined to have been satisfied, associating the first internet protocol address with a wireless router for transmission of the voice signal data; and
    in response to the condition associated with a second internet protocol address being determined not to have been satisfied, facilitating blocking the second internet protocol address via the virtual internet gateway device to prevent transmission of the voice signal data.

16. The machine-readable storage medium of claim 15, wherein the virtual internet gateway device is associated with second wireline signal data different than the first wireline data.

17. The machine-readable storage medium of claim 15, wherein the operations further comprise:
   managing a modem via a network device associated with a mobility service provider identity.

18. The machine-readable storage medium of claim 15, wherein the operations further comprise:
   managing the voice signal data via a network device associated with a mobility service provider identity.

19. The machine-readable storage medium of claim 15, wherein the device using the first internet protocol address is associated with a private branch exchange device.

20. The machine-readable storage medium of claim 15, wherein the operations further comprise:
   receiving data associated with an available internet protocol address via a service provider network device associated with a service provider identity.

\* \* \* \* \*